US008974012B2

(12) United States Patent
Griffith et al.

(10) Patent No.: US 8,974,012 B2
(45) Date of Patent: Mar. 10, 2015

(54) AUTOBRAKING INTERLOCK FOR AN AIRCRAFT ELECTRIC BRAKE SYSTEM

(71) Applicant: The Boeing Company, Seal Beach, CA (US)

(72) Inventors: T. Todd Griffith, Seattle, WA (US); David T. Yamamoto, Mill Creek, WA (US); Andreea D. Uta, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/712,762

(22) Filed: Dec. 12, 2012

(65) Prior Publication Data

US 2013/0116862 A1 May 9, 2013

Related U.S. Application Data

(63) Continuation of application No. 11/615,793, filed on Dec. 22, 2006, now Pat. No. 8,393,689.

(51) Int. Cl.
*B60T 8/86* (2006.01)
*B64C 25/44* (2006.01)
(Continued)

(52) U.S. Cl.
CPC . *B64C 25/44* (2013.01); *B60T 7/12* (2013.01); *B60T 8/00* (2013.01); *B60T 8/1703* (2013.01); *B60T 13/746* (2013.01)
USPC ............................................. 303/126; 303/20

(58) Field of Classification Search
CPC ...... B60T 8/1703; B04C 25/44; B04C 25/426
USPC ............................................. 303/20, 15, 126
See application file for complete search history.

(56) References Cited

U.S. PATENT DOCUMENTS

| 4,007,970 A | 2/1977 | Romero |
| 6,095,293 A | 8/2000 | Brundrett et al. |

(Continued)

FOREIGN PATENT DOCUMENTS

| EP | 0898340 A1 | 2/1999 |
| GB | 2271678 | 4/1994 |

(Continued)

OTHER PUBLICATIONS

US Patent and Trademark Office, Office Action for U.S. Appl. No. 11/615,793, filed Dec. 22, 2006, mailed May 10, 2012, USA.

(Continued)

*Primary Examiner* — Bradley King
(74) *Attorney, Agent, or Firm* — Parsons Behle & Latimer

(57) ABSTRACT

An electric autobrake interlock system for an aircraft includes an autobrake power interlock mechanism that prevents inadvertent (uncommanded) application of brakes. The autobrake power interlock removes operating power from the brake actuators whenever the autobrake actuation data does not indicate a legitimate autobrake application condition. The interlock processing occurs in parallel with the autobrake command processing such that even if an inadvertent autobrake command is generated, the brake actuators will be enable to act upon the inadvertent autobrake command. In this regard, the brake actuators are unable to apply brakes automatically unless the following two actions happen concurrently: the operating power is provided to enable the electric brake actuators and autobrake actuation control is commanded in response to the legitimate autobrake application condition.

13 Claims, 5 Drawing Sheets

(51) Int. Cl.
  *B60T 7/12* (2006.01)
  *B60T 8/00* (2006.01)
  *B60T 8/17* (2006.01)
  *B60T 13/74* (2006.01)

(56) References Cited

U.S. PATENT DOCUMENTS

| | | |
|---|---|---|
| 6,183,051 B1 | 2/2001 | Hill et al. |
| 6,513,885 B1 | 2/2003 | Salamat et al. |
| 6,702,069 B2 | 3/2004 | Ralea et al. |
| 2004/0184247 A1 | 9/2004 | Adriaenssens et al. |
| 2005/0269872 A1 | 12/2005 | Ralea |

FOREIGN PATENT DOCUMENTS

| | | |
|---|---|---|
| GB | 2314466 A | 12/1997 |
| WO | WO0217442 A2 | 2/2002 |

OTHER PUBLICATIONS

US Patent and Trademark Office, Office Action for U.S. Appl. No. 11/615,793 dated Sep. 15, 2010.
US Patent and Trademark Office, Final Office Action for U.S. Appl. No. 11/615,793 dated Mar. 17, 2011.
US Patent and Trademark Office, Office Action for U.S. Appl. No. 11/615,793 dated Aug. 17, 2011.
Patent Cooperation Treaty, International Search Report and Written Opnion dated Oct. 11, 2008.

AUTOBRAKING INTERLOCK FOR AN AIRCRAFT ELECTRIC BRAKE SYSTEM

Priority Claim

The present application is a continuation of U.S. patent application Ser. No. 11/615,793, filed on Dec. 22, 2006, the disclosure of which is incorporated herein by reference in its entirety.

TECHNICAL FIELD

Embodiments of the present invention relate generally to an electric brake system for an aircraft. More particularly, embodiments of the present invention relate to an autobrake interlock system for an electric brake system of an aircraft.

BACKGROUND

Many aircraft utilize brake systems having brake mechanisms that are controlled by direct cable or hydraulic control architectures. Modern aircraft are beginning to replace conventional cable actuated and hydraulic actuated aircraft brake systems with electrically actuated and electrically controlled brake systems. An aircraft brake system should be designed with safety features that prevent inadvertent braking (i.e., the application of brakes in the absence of a legitimate braking command from the pilot or an automated aircraft system). Moreover, an aircraft brake system should include sufficient processing redundacy to provide reliable brake control and robustness.

BRIEF SUMMARY

An electric autobrake interlock system suitable for use with an aircraft includes an autobrake interlock arrangement that controls whether or not operating power is provided to the electric brake actuators that govern wheel braking. The autobrake interlock arrangement includes a hardware-based power control architecture that regulates operating power for brake mechanisms in parallel with a software-based command architecture that generates brake mechanism control signals. In one embodiment, a plurality of such interlock arrangements are employed in an independent manner for a plurality of wheel brakes (or for a plurality of wheel brake groups), thus providing reliability and robustness. The electric autobrake interlock system makes use of throttle resolver angle (TRA) data to drive the autobrake interlock to enable/disable application of the autobrake. The TRA data is used by the aircraft engines and is made available on the aircraft's digital communication system. In practice, the autobrake design may make use of network architecture already present on the airplane (there may be no added data transport design elements added for dedicated autobrake use).

The above and other aspects of the invention may be carried out in one embodiment by a control arrangement for an electric autobrake interlock system of an aircraft. The control arrangement includes an actuator power control architecture configured to process the autobrake input signals and to enable/disable operating power for a brake actuation of the electric brake system. The control arrangement also includes autobrake command architecture in parallel with the actuator power control architecture. The autobrake command architecture is configured to process the autobrake input signals and to generate a brake actuation control command in response to autobrake actuation data for the electric brake system. The actuator power control architecture is capable of preventing actuation of the brakes independently of the antobrake command architecture. Conversely, the autobrake command architecture is capable of preventing actuation of the brakes independently of the actuator power control architecture.

The above and other aspects of the invention may be carried out in another embodiment by a method for providing an autobrake interlock for an electric brake system of an aircraft. The method involves receiving autobrake actuation data, processing the autobrake actuation data, and if the autobrake actuation data does not indicate an autobrake application condition, regulating operating power for a brake mechanism to temporarily disable the brake mechanism. Concurrently with and independent of this power control scheme, the method processes the autobrake actuation data, and if the autobrake actuation data does not indicate the autobrake application condition, the method prevents actuation of the brake mechanism. The method provides actuation control for the brake mechanism and is particular for the electric brake actuators if the following two actions happen concurrently: the operating power is provided to enable the electric brake actuators, and a brake actuation control is commanded in response to a legitimate autobrake application condition.

The above and other aspects of the invention may be carried out in another embodiment by an electric autobrake interlock system for an aircraft. The electric autobrake interlock system includes a brake mechanism for a wheel of the aircraft and an autobrake control architecture coupled to the brake mechanism. The autobrake control architecture includes an autobrake command control configured to generate brake mechanism command signals for the brake mechanism and in particular for the electric brake actuators in response to autobrake actuation data, and an interlock mechanism configured to regulate operating power for the brake mechanism and in particular for the electric brake actuators in response to the autobrake actuation data. The interlock mechanism operates concurrently with operation of the autobrake command control, and independent of the autobrake command control.

This summary is provided to introduce a selection of concepts in a simplified form that are further described below in the detailed description. This summary is not intended to identity key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realised by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 2:
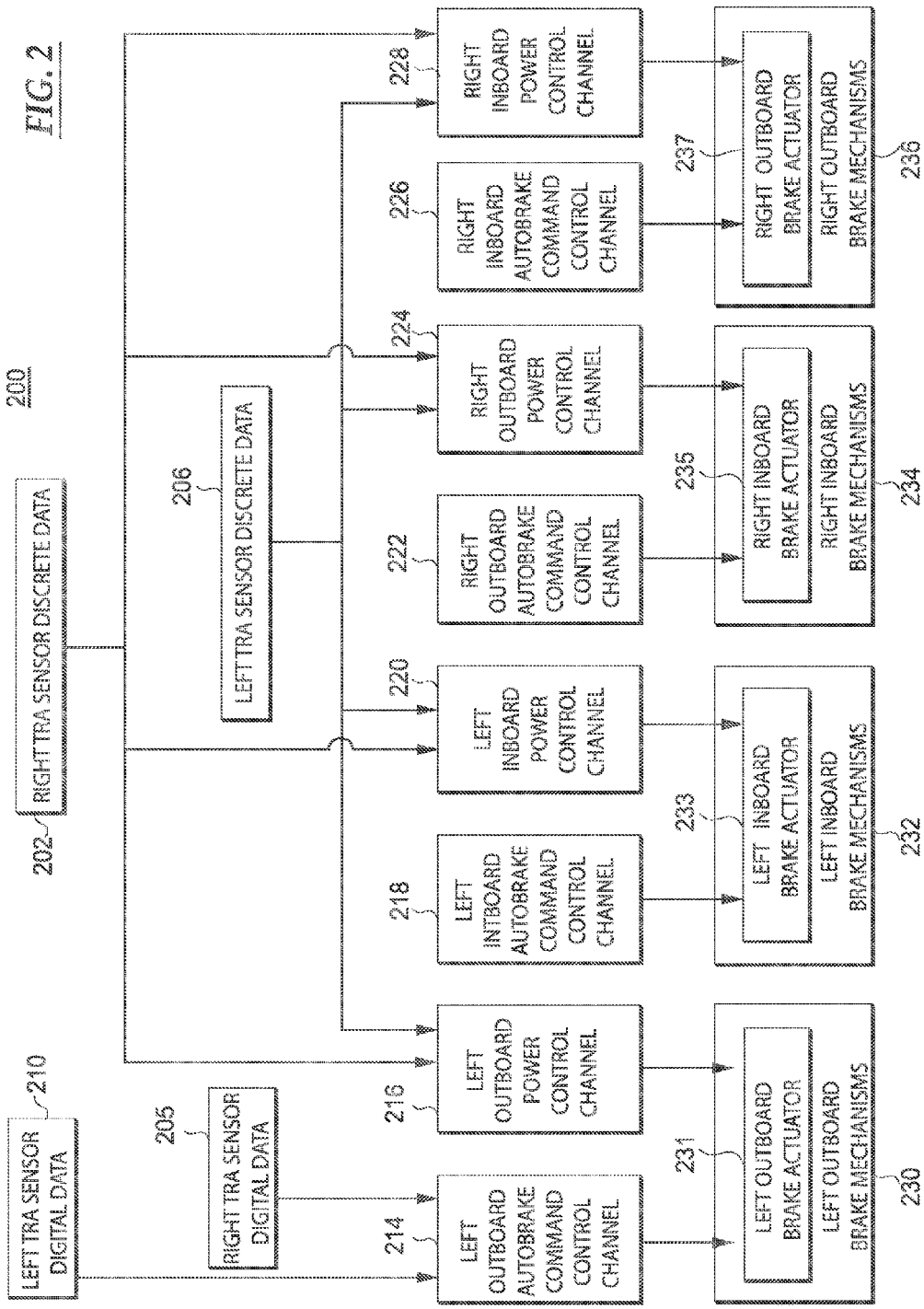
FIG. 2 is a diagram that illustrates independent processing channels of an aircraft electric brake system.
Figure 3:
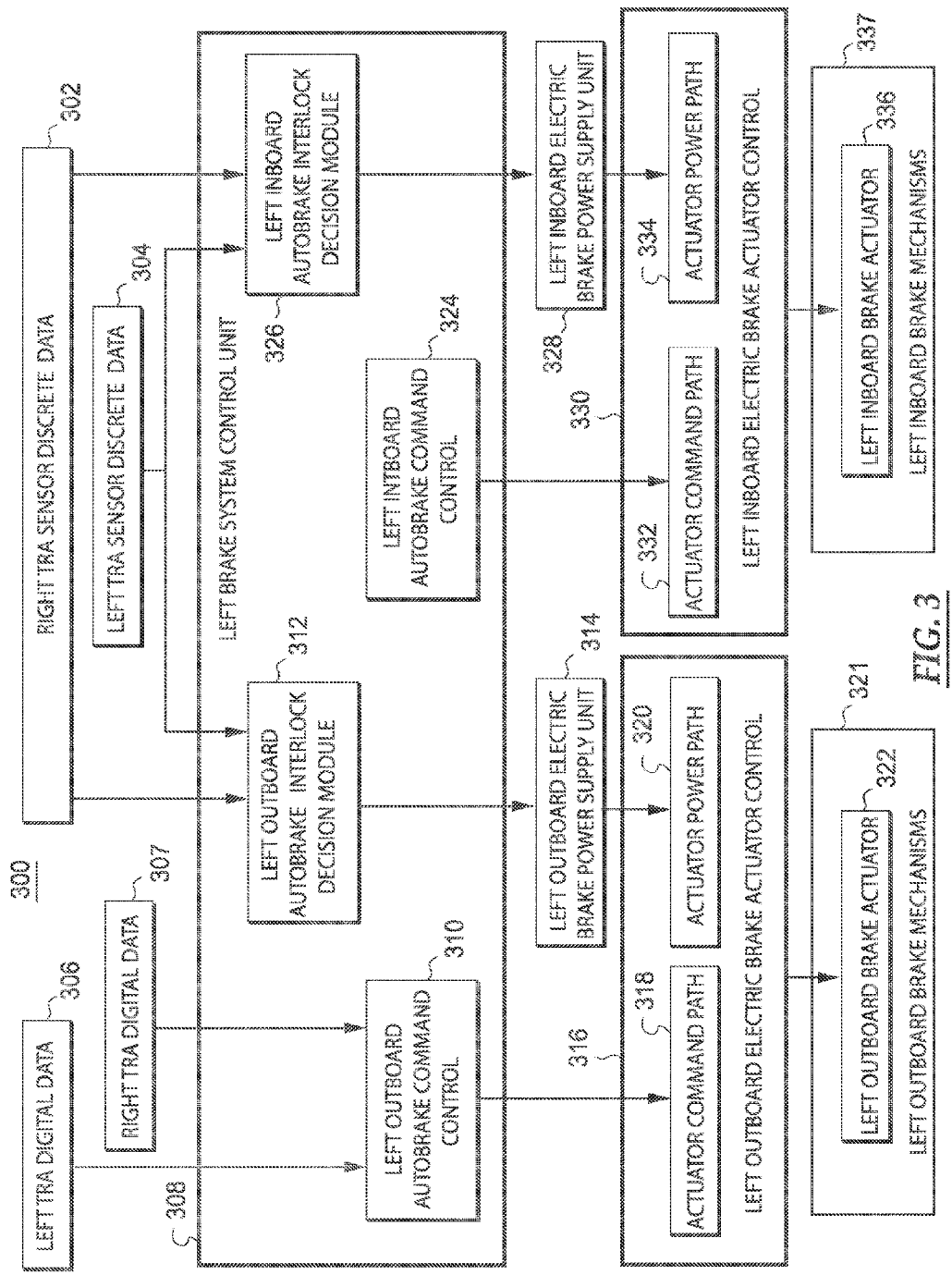
FIG. 3 is a schematic representation of a portion of an aircraft electric brake system.

The following description refers to elements or nodes or features being "connected" or "coupled" together. As used, herein, unless expressly stated, otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may he present in an embodiment of the invention.

An aircraft as described herein employs an electric brake system, which may be powered by any suitable power supply, such as a main aircraft battery, or an active aircraft power supply that is operational when the aircraft engine(s) are running. Advance airplanes employ autobrake. Autobrake is a type of automatic brake system that frees the pilot to perform other tasks during takeoff or landing at times when the aircraft's brake system can he handled by automated systems. When landing, the autobrake allows the pilot to monitor other systems and control the airplane while the braking is handled automatically. The aircraft automatically engages wheel braking upon touchdown on the runway. An additional advantage of engaging the autobrake instead of using pedal braking is the/uniform deceleration made possible by the closed loop brake control algorithms. The degree of braking may be selected, and brake application is automatically modulated such that the aircraft decelerates at the selected level regardless of other deceleration factors such as aircraft drag, thrust reversers, or spoilers. When taking off, the aircraft's autobrake can be set to a rejected takeoff (RTO) mode. When, in the RTO setting, the aircraft monitors certain statics indicators and engages RTO braking depending on those indicators. For example, if thrust reversing is activated, or if the pilot returns both throttles to the "idle" position. The electric autobrake system includes an interlock feature that is independent of the autobrake command feature that generates the various brake mechanism control signals. The interlock feature is suitably configured to prevent inadvertent, application of the aircraft autobrakes by removing the actuation power from the electric brake actuators. Thus, even if the actuators are inadvertently commanded to apply brakes, the lack of actuation power renders them unable to respond to the inadvertent autobrake command. Similarly, if the actuation power is supplied to the actuators, the lack of autobrake command, renders them unable to inadvertently apply brakes.

Figure 1:
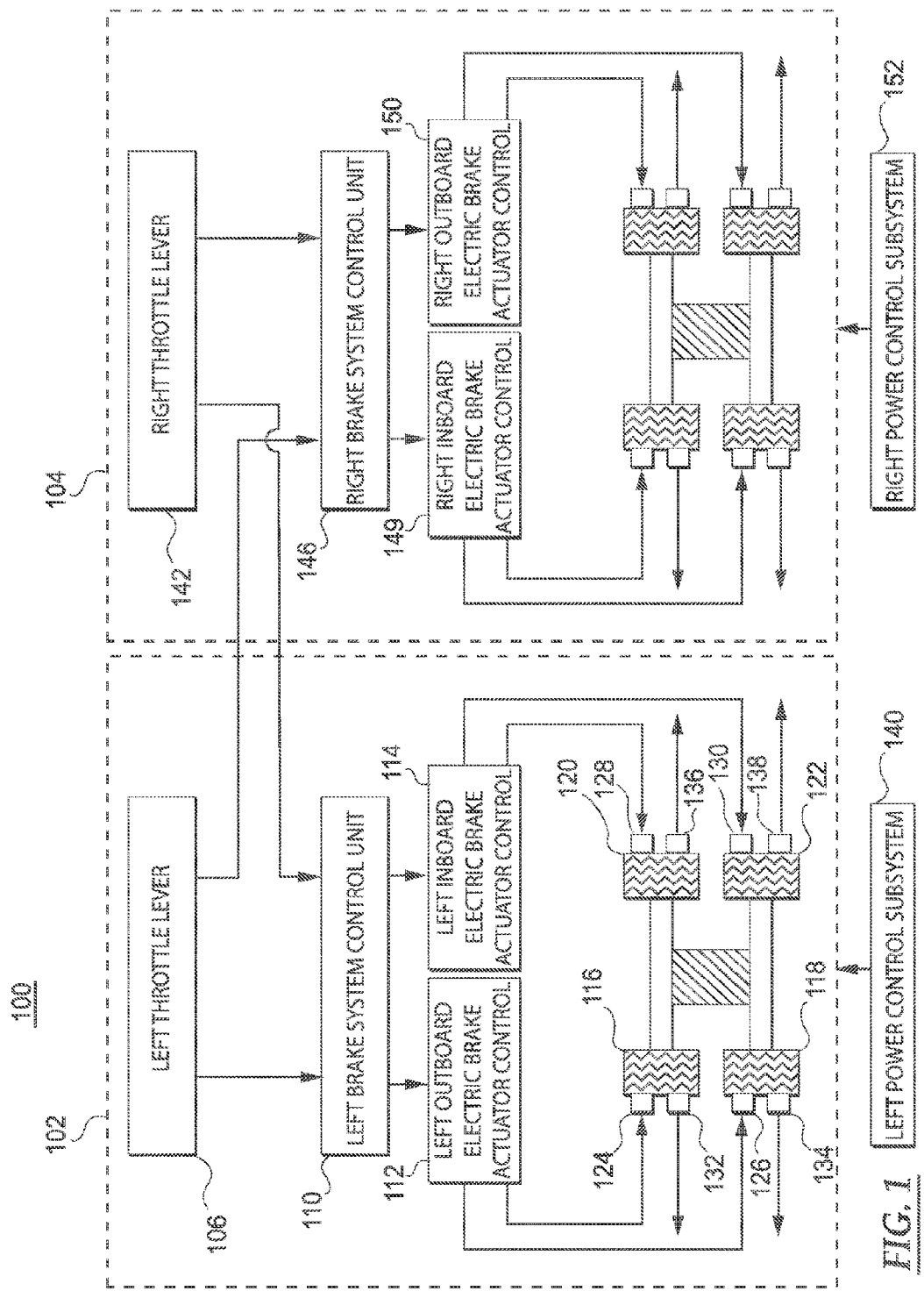
FIG. 1 is a schematic representation of an aircraft electric brake system.

FIG. 1 is a schematic representation of an example embodiment of an electric brake system 100 for an aircraft. In the example embodiment shown, in FIG. 1, the aircraft employs a left electric brake subsystem architecture 102 and a right electric brake subsystem architecture 104, which are similarly configured. The terms "left" and "right" refer to the port and starboard of the aircraft, respectively. In practice, the two subsystem architectures 102/104 may be independently controlled in the manner described below. For simplicity, only left electric brake subsystem architecture 102 is described in detail below. It should be appreciated that the following description also applies to right electric brake subsystem architecture 104.

For this example deployment, left electric brake subsystem architecture 102 generally includes: a throttle lever 106; a brake system control unit (BSCU) 110; an outboard electric brake actuator control (EBAC) 112 coupled to BSCU 110; an inboard EBAC 114 coupled to BSCU 110; an outboard wheel group that includes a fore wheel 116 and an aft wheel 118; an inboard wheel group that includes a fore wheel 120 and an aft wheel 122; electric brake mechanisms (not shown in FIG. 1) coupled to the EBACs; and remote data concentrators (reference numbers 132, 134, 136, and 138). Each electric brake mechanism includes at least one electric brake actuator (reference number 124, 126, 128 and 130) that is controlled by the respective EBAC. The electric brake mechanisms and the remote data concentrators correspond to each wheel of left electric brake subsystem architecture 102. Although, not shown in FIG. 1, an embodiment may have more than one electric brake mechanism and more than, one remote data concentrator per wheel.

Electric brake system 100 can be applied to any number of electric braking configurations for an aircraft, and electric brake system 100 is depicted in a simplified manner for ease of description. An embodiment of electric brake system 100 as deployed may include, any number of BSCUs, any number of EBACs coupled to and controlled by each BSCU, and any number of brake mechanisms for each wheel (or for each group of wheels). In operation, electric brake system 100 can independently generate and apply brake actuator control, signals for each wheel of the aircraft or concurrently for any group of wheels.

The elements in left electric brake subsystem architecture 102 can be coupled together using a data communication bus or any suitable interconnection arrangement or architecture. For example, a digital data communication bus or buses may be configured to communicate EBAC control signals from BSCU 110 to the EBACs, to communicate actuator control signals from the EBACs to the electric brake actuators 124/126/128/130, etc. Briefly, BSCU 110 reacts to manipulation of throttle levers 106/142 and generates control signals that are received by EBACs 112/114. In turn, EBACs 112/114 generate brake mechanism control signals that are received by electric brake mechanisms and in particular by the actuators 124/126/128/130. In turn, the electric brake actuators 124/126/128/130 engage to impede or prevent rotation of the respective wheels. These features and components are described in more detail below.

Throttle levers 106 and 142 are configured to provide inputs to electric brake system 100. A pilot may physically manipulate throttle lever 106 and 142, resulting in rotation or movement (i.e., some form of physical input) of throttle lever 106 and 142. For example, electric brake system 100 (and BSCU 110 in particular) may be configured to prevent the application of autobrakes if the thrust levers are not at idle, as explained in detail in context of FIG. 4 below. This physical rotation or throttle resolver angle (TRA) is measured from us natural position by one or more thrust lever sensors, converted into a BSCU control signal and sent to BSCU 110. The BSCU may convey a desired autobraking condition for brake actuators 124/126/128/130, or may disable brake actuators 124/126/128/130 as explained in detail in context of FIG. 4 below.

An embodiment of electric brake system 100 may use any number of BSCUs 110. For ease of description, this example includes only one BSCU 110. BSCU 110 is an electronic control unit that has embedded software that digitally computes EBAC control signals that represent braking commands. The electrical and software implementation allows further optimization and customization of braking performance and feel if needed for the given aircraft deployment.

BSCU 110 may be implemented or performed with a general purpose processor, a content addressable memory, a digital signal processor, an application, specific integrated circuit, a field programmable gate array, any suitable programmable logic device, discrete gate or transistor logic, discrete hardware components. Or any combination thereof designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 110 is implemented with a computer processor (such as a PowerPC 555) that hosts software and provides external interfaces for the software.

BSCU 110 monitors various aircraft inputs to provide control functions such as, without limitation: pedal braking; parking braking; automated braking; and gear retract braking. In addition, BSCU 110 blends antiskid commands (which could be generated internally or externally relative to BSCU 110) to provide enhanced braking performance. BSCU 110 obtains pilot command control signals from brake pedals (not shown in FIG. 1), along with additional command control signals such as input from both throttle levers 106/42. BSCU 110 may also receive additional control data (e.g., wheel speed, rotational direction, tire pressure, etc.) from remote data concentrators 132/134/136/138. BSCU 110 processes its input signals and generates one or more EBAC control signals that are received by EBACs 112/114. In practice, BSCU 110 transmits the EBAC control signals to EBACs 112/114 via a digital data bus. In a generalized architecture (not shown), each BSCU can generate independent output signals for use with any number of EBACs under its control.

BSCU 110 is coupled to EBACs 112/114 in this example. Each EBAC 112/114 may be implemented, performed, or realised, in the manner described above for BSCU 110. In one embodiment, each EBAC 112/114 is realised with a computer processor (such as a PowerPC 555) that hosts software, provides external interfaces for the software, and includes suitable processing logic that is configured to carry out the various EBAC operations described herein. Each EBAC 112/114 obtains EBAC control signals from BSCU 110, processes the EBAC control signals, and generates the brake mechanism control signals (brake actuator signals) for its associated electric brake mechanisms.

Notably, the functionality of BSCU 110 and EBACs 112/114 may be combined into a single processor-based feature or component. In this regard, BSCU 110, EBAC 112, EBAC 114, or any combination thereof can be considered to be an brake control architecture for electric brake system 100. Such brake control architecture includes suitably configured processing logic, functionality, and features that support the autobrake control operations described herein.

Each wheel may include an associated electric brake mechanism, and each brake mechanism may include one or more electric brake actuators. Consequently, braking for each wheel may be independently and individually controlled by electric brake system 100. Each electric brake actuator is suitably configured to receive actuator control signals from its respective EBAC, wherein the actuator control signals influence adjustment of the electric brake actuator. In this embodiment, each electric brake actuator in electric brake system 100 is coupled to and controlled by an EBAC. In this manner, EBACs 112/114 control the electric brake actuators to apply, release, modulate, and otherwise control the application of the wheel brakes. In this regard, EBACs 112/114 generate the brake control signals in response to the respective EBAC control signals generated by BSCU 110. The brake control signals are suitably formatted and arranged for compatibility with the particular brake system utilized by the aircraft. Those skilled in the art are familiar with aircraft brake mechanism and the general manner in which the brake is controlled and such known aspects will not be described in detail here.

The left electric brake subsystem architecture 102 may include or cooperate with a suitably configured power control subsystem 140. Power control subsystem 140 may be coupled to BSCU 110, to EBACs 112/114 (and/or to other components of electric brake system 100). In this embodiment, power control subsystem 140 is suitably configured to provide, apply, remove, switch, or otherwise regulate the operating power for the electric brake mechanisms and/or the electric brake actuators as needed. For example, power control subsystem 140 can remove power from EBACs 112/114 and/or other components of left electric brake subsystem architecture 102 as needed to provide an interlock feature for electric brake system 100. As described in more detail below, power control subsystem 140 may be implemented with a left outboard power supply unit and a left inboard power supply unit that function in an independent manner to regulate operating power for the left outboard and left inboard electric brake components.

Right electric brake subsystem architecture 104 has a structure that is similar to left electric brake subsystem architecture 102 (common features, functions, and elements will not be redundantly described here). For this example deployment, as shown in FIG. 1, right electric brake subsystem architecture 104 includes: a right throttle lever 142 that is separate and distinct from throttle lever 106; a BSCU 146; an inboard EBAC 148; an outboard EBAC 150; and a power control, subsystem 152 that is separate and distinct from power control subsystem 140. The two sides of electric brake system 100 receive autobrake brake actuation data, from both throttle levers 100/142. Alternatively, the two sides of electric brake system 100 may utilize other separate and distinct brake actuation, mechanisms (not shown in FIG. 1). These various components of right electric brake subsystem architecture 104 are coupled together to operate as described above for left electric brake subsystem architecture 102, however, the right-side processing is preferably independent of the left side processing.

In accordance with one embodiment of an electric brake system for an aircraft, an autobrake interlock mechanism or feature is provided to prevent inadvertent application of the wheel brakes. A system or a control mechanism in the electric brake system can be designed to implement such an autobrake interlock feature. For example, electric brake system 100 may be configured to support an electric autobrake interlock system.

FIG. 2 is a diagram that illustrates independent processing channels of an aircraft electric autobrake interlock system configured in accordance with an embodiment of the invention. In particular, FIG. 2 depicts a left outboard power control, channel 216, a left outboard autobrake command control channel 214, a left inboard power control channel 220, a left inboard autobrake command control channel 218, a right inboard power control channel 228, a right inboard autobrake command control, channel 226, a right outboard power control channel 224, and a right, outboard autobrake command control channel 222. These processing channels may be realized in dm components of electric brake system 100, e.g., the BSCUs, the EBACs, the power control subsystems, etc. In practice, each processing channel may include, without limitation: hardware components; digital logic elements; processing logic; circuit components; or any suitably configured architecture, arrangement, or feature. Moreover, each processing channel is suitably configured to perform the respective operations described herein.

For this example, the left processing channels correspond, to left-side processing of the electric brake system and the right processing channels correspond to right-side processing of the electric brake system. In this regard, the left and right processing power channels each may be fed by both left and right TRA sensor discrete (a binary signal with two possible states: high or low) data modules 202/206. These TRA sensor discrete data modules 202/206 are configured to provide autobrake actuation data to the left and right power processing channels. In an embodiment of an electric brake system, both left and right TRA digital data (string of binary data) modules 210/205 provide autobrake actuation data for the left command processing channels.

Left outboard power control channel 216 and left outboard autobrake command control channel 214 cooperate to influence the operation of left outboard brake mechanisms 230 and in particular left outboard brake actuator(s). In this regard, left outboard power control channel 216 and left outboard autobrake command control channel 214 represent a control arrangement for the left outboard architecture of the electric autobrake system. For this example, left outboard power control channel 216 is suitably configured to provide the electric brake actuator operating power for left outboard brake mechanisms 230 using, e.g., a 130 volt power supply (not shown in FIG. 2). Left outboard power control channel 216 functions to switch the left outboard brake mechanisms 230. In one embodiment, left outboard power control channel 216 is suitably configured to regulate operating power for an EBAC coupled to left outboard brake mechanisms 230 and more specifically to the left outboard brake actuator(s) 231 as explained in detail in context of FIG. 4 below.

Left outboard autobrake command control channel 214 is in parallel with left outboard power control channel 216. Thus, it operates concurrently with and independent of left outboard power control channel 216. Left outboard autobrake command control channel 214 is suitably configured to process brake mechanism control signals for left outboard brake mechanisms 230. In one embodiment, left outboard autobrake command control channel 214 is configured to generate brake control signals for execution by an EBAC coupled to left outboard brake mechanisms 230 and more specifically to the left outboard brake actuator 231. Notably, the brake control signals are effective only when left outboard brake actuator 231 is provided with adequate operating power. Accordingly, left outboard brake actuator 231 will be actuated if left outboard power control channel 216 enables operating power while the brake control signal commands the application of some clamping force. In contrast, left outboard brake actuator 231 will remain in a released (non-actuated) state if left outboard autobrake command control channel 214 disables operating power or if the brake control signal commands no clamping force.

In a preferred embodiment, the processing channels of the electric brake system are substantially (if not totally) independent of each other. For example, left outboard power control channel 216 is suitably configured to prevent actuation of left outboard brake mechanisms 230 and more specifically the left outboard brake actuator 231 independently of left outboard autobrake command control channel 214. Likewise, left outboard autobrake command control channel 214 is suitably configured to prevent actuation of left outboard brake actuator 231 independently of left outboard power control channel 216. Those processing channels receive different actuation data types via independent paths, and/or from separate data interfaces. The autobrake command processing channels 214/218/222/226 receive TRA digital data from TRA sensor data modules 210/203 (shown only for outboard autobrake command control channel 214 in FIG. 2) and the power control channels 216/220/224/22B each receive discrete data from TRA sensor discrete data modules 202/206. In addition, the control arrangements for the left outboard, brake mechanisms 230 and in particular the left outboard brake actuator 231, the left inboard brake mechanisms 232 and in particular the left inboard brake actuator 233, the right inboard brake mechanisms 234 and in particular the right inboard brake actuator 235, and the right outboard brake mechanisms 236 and in particular the right outboard brake actuator 237 are substantially (if not totally) independent of each other. For example, the four control arrangements may operate concurrently with, and independent of each other, or the left-side autobrake control architecture may operate concurrently with, and independent of, the right-side autobrake control architecture. The remaining three control arrangements depicted in FIG. 2 operate as described, above for the left outboard processing channels.

FIG. 3 is a schematic representation of a portion of an aircraft electric brake system configured in accordance with an embodiment of the invention. In particular, FIG. 3 depicts components of a left electric brake subsystem architecture 300 (as mentioned above, the right electric brake subsystem architecture has a similar structure). The electric brake system may also be configured as described above in the context of FIG. 1 and FIG. 2. Accordingly, certain features, components, and functions of left electric brake subsystem architecture 301) will not be redundantly described here.

Left electric brake subsystem architecture 300 may include a BSCU 308, an outboard electric brake power supply unit (EBPSU) 314, an inboard EBPSU 328, an outboard EBAC 316, an inboard EBAC 330, one or more outboard brake mechanisms 321 including at least one left outboard brake actuator 322, and one or more inboard brake mechanisms 337 including at least one left inboard brake actuator 336. Subsystem architecture 300 is suitably configured to receive or process autobrake actuation data from left TRA sensor digital data module 306, right TRA sensor digital data module 307, right TRA sensor discrete data module 302, left TRA sensor discrete data module 304 or from other autobrake actuation sensor(s) data modules(s) not shown in FIG. 3.

BSCU 308 is generally configured as described above for BSCU 110. BSCU 308 may include, an outboard autobrake interlock decision module 312, an outboard autobrake command control module 310, an inboard autobrake command control module 324, and an inboard autobrake interlock decision module 326. In this example, both left and right TRA sensor discrete data modules 302/304 make the TRA autobrake actuation, discrete data available to each outboard and inboard autobrake interlock decision module 312/326. The left and right TRA sensor digital data modules 306/307 make the digital data available to each outboard and inboard autobrake command control modules 310/324.

Each autobrake interlock decision, module 312/326 processes autobrake actuation data, and generates, in response to the autobrake actuation data, a respective enable/disable control signal for a power supply (e.g., an EBPSU) of a brake mechanism. Here, outboard interlock decision module 312 generates one enable/disable control signal for outboard EBPSU 314, while inboard autobrake interlock decision module 326 generates another enable/disable control signal for inboard EBPSU 328. If, for example, the autobrake actuation data, indicates an autobrake application condition, then each autobrake interlock decision module 312/326 will independently enable operating power to its respective brake mechanism(s). As used here, a "autobrake application condition" means any operating status, state, or configuration of the aircraft that is intended to result in the application of the autobrakes. For example, an antobrake application condition may result from; placing all throttle levers to an idle position; decreasing the aircraft acceleration below threshold acceleration, activation of an autobraking mode; or the like. On the other hand, if the autobrake actuation data does not indicate an antobrake application condition, then each autobrake interlock, decision modules 312/326 will independently disable operating power for its respective brake mechanism(s). This feature prevents inadvertent application of autobrake, which might otherwise occur if an erroneous autobraking command is propagated through left electric brake subsystem architecture 300.

Each autobrake interlock decision module 312/326 may be realized in hardware using digital logic gates and related circuitry that processes the antobrake actuation data to generate the respective enable/disable control signals as explained in the context of FIG. 4 below. In this regard, an enable/disable control signal may be a binary control signal having logic high and low states. The EBPSUs 314/328 respond to the respective enable/disable control signals in an appropriate manner.

Although, in this embodiment, left outboard autobrake command control 310 is suitably configured to generate respective brake actuation command signals in response to the autobrake actuation data, the autobrake command control 324 may also be suitably configured to generate respective brake actuation, command signals in response to the autobrake actuation. Here, outboard autobrake command, control 310 module generates brake actuation command signals for outboard EBAC 316, which in turn controls outboard brake mechanism 321 and more specifically left outboard brake actuator 322, while inboard autobrake command control 324 generates independent brake actuation command signals for inboard EBAC 330, which in turn controls inboard brake mechanisms 337 and more specifically inboard brake actuator 336. In practice, the brake mechanism, control signals influence the actuation, of the electric brake actuators in the brake mechanisms, (i.e., the percentage of full clamping force imparted, by the electric brake actuators). For example, a brake actuation command signal may command the electric brake actuators to release or apply no clamping force, it may command the electric brake actuators to apply full clamping force, or it may command the electric brake actuators to apply some intermediate clamping force.

Outboard autobrake interlock decision module 312 and outboard autobrake command control 310 operate concurrently (yet independently) on the autobrake actuation data. Likewise, inboard autobrake interlock decision, module 326 and inboard autobrake command control 324 operate concurrently (yet independently) on the autobrake actuation data. The segregation of processing architectures in this manner improves reliability and robustness of the electric autobrake interlock system.

In this embodiment, BSCU 308 controls EBPSUs 314/328 to enable/disable brake actuators 322/336 as needed. Each EBPSU 314/328 is configured to provide the operating voltage to its respective EBAC 316/330. As mentioned above in connection with FIG. 2, the nominal EBAC operating voltage for this embodiment is about 130 volts. Thus, the EBPSUs can enable/disable the brake actuators by providing/removing this 130 volt supply voltage to/from the EBACs.

Outboard EBPSU 314 may employ an actuator power path 320 and an actuator command path 318. Actuator power path 320 represents a structure, a channel, or an architecture configured to provide the operating power from outboard EBPSU to left outboard brake mechanisms 322. Actuator command path 318 represents a structure, a channel, or an architecture configured to process and transfer autobrake control signals from BSCU 308 to outboard brake mechanisms 321. Inboard EBAC 330 also includes similarly configured actuator command and actuator power paths. In this example, these four paths are separate and independent of each other.

Figure 4:
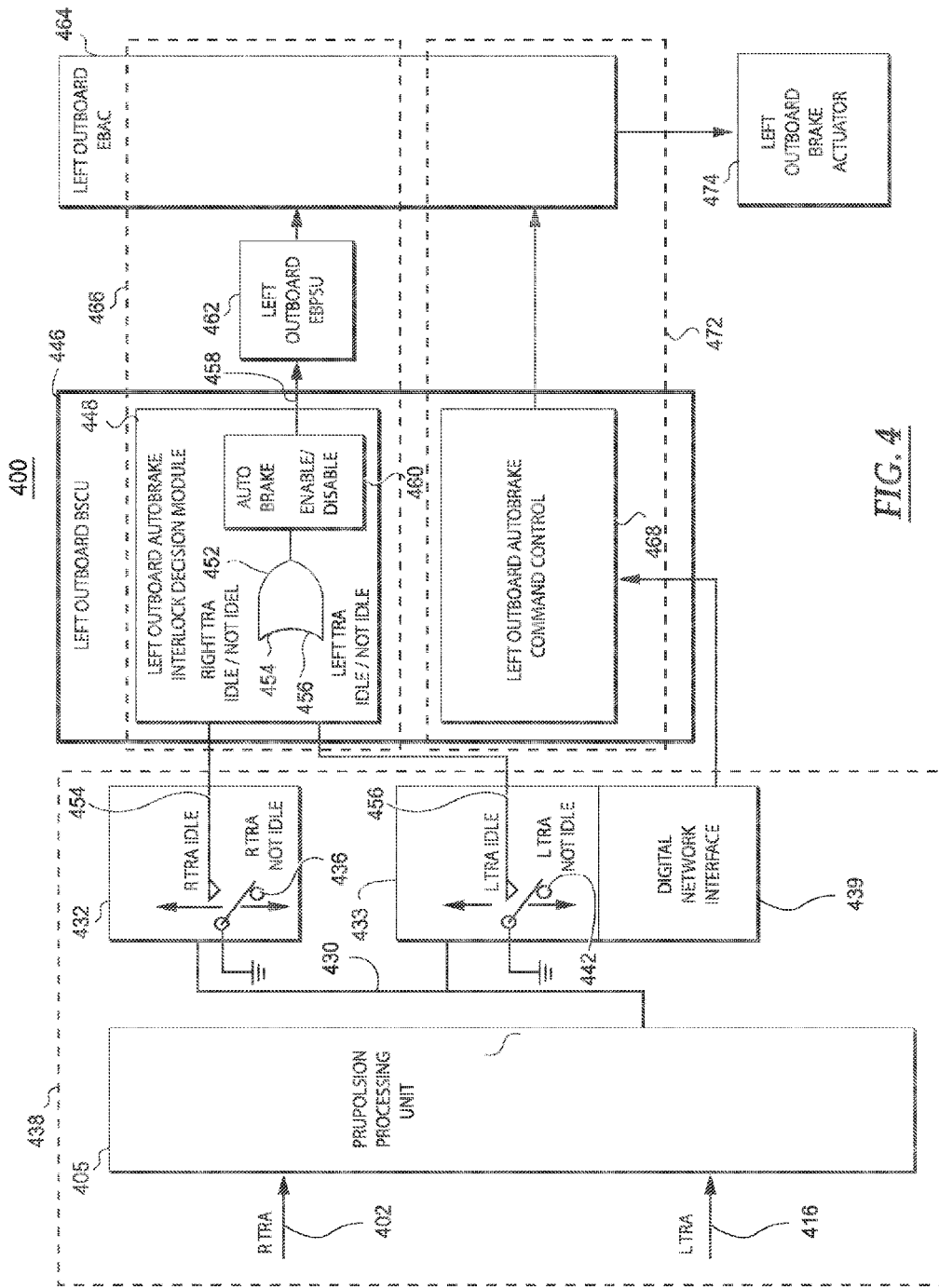
FIG. 4 is a schematic, representation of an electric autobrake interlock system, for a portion of an aircraft electric brake system.

FIG. 4 is a schematic representation of an electric autobrake interlock system for a portion (left outboard) of an aircraft electric brake subsystem architecture 400 configured in accordance with an embodiment of the invention. For this example deployment, subsystem architecture 400 generally includes: an autobrake actuator data generator system 438, a power control processing channel 466, an autobrake command processing channel 472, a BSCU 446, an EBAC 464 and a brake actuator 474. Subsystem, architecture 400 may also be configured as described, above in the context of FIGS. 1-3. Accordingly, certain features, components, and functions of subsystem architecture 400 will not be redundantly described here.

Autobrake actuator data generator system 438 generally includes: a right throttle lever 402, a left throttle lever 416, a propulsion processing unit 405, a right network interlace (RNI) 432 which includes a right TRA, data switch 436, a left network interface (LNI) 433 which includes a left TRA data switch 442. Subsystem architecture 400 is suitably configured to receive or process autobrake actuation data from right TRA sensor interfaces 406/408 via RNI 432, autobrake actuation data from left TRA sensor interfaces 420/422 via a LNI 433, and brake actuation command inputs from a network interface 439.

Throttle levers 402/410 are configured to provide input to the propulsion processing unit 405 in order to provide input to electric brake subsystem 400 as explained in the context of FIG. 1 above.

The propulsion, processing unit 405 is configured to provide the TRA inputs to the RNI/LNI 432/433 via the electric airplane network bus 430. Power to the brakes to enable autobrake is desired whenever the TRA sensors 405/407 and 410/421 values indicate idle (TRA values are below a threshold value). Otherwise, power is not provided to the brakes in a manner to interlock/disable the antobrake.

RNI/LNI 432/433 provide left TRA sensors values and right TRA sensors values to the BSCU 446. To protect against inadvertent braking (i.e., data, error), each RNI/LNI 432/433 receives two digital TEA positions form the propulsion unit 405. For example, right RNI 432 receives redundant right TRA digital values. The right RNI 432 gateways the first valid available value out of the redundant copies of right TRA digital values and the LNI 433 gateways the first valid available value out of the redundant copies of left TRA digital values. Each RNI/LNI 432/433 then performs a digital to analog conversion (not shown in FIG. 4) based on a digital discrete signal indicating whether their respective throttle is at "Idle" or "Advanced" to obtain an analog discrete output signal (high/low) suitable for operation of the power control processing channel 466 and in particular BSCU 446. The LNI/RNI provide the signal high/low values of the left and right TRAs to the BSCU 446 and in particular to the autobrake interlock decision module 448.

A TRA signal high value is provided to the power control processing channel 466 via TRA data switches 436/442. Notably TRA data switches 436/442 are shown in an open position in an example embodiment of FIG. 4 indicating TRA sensor values are not idle. When TRA sensor values indicate idle, TRA data witches 436/442 close. In this regard, based upon the TRA sensor values idle/not idle; the power processing channel controls power supply to the brakes as explained below.

The power control processing channel 466 may generally include an autobrake interlock decision module 448 and an EBPSU 462. The power control processing channel 466 may be realized in the components of electric brake subsystem architecture 400, e.g., the BSCU 446, and the EBAC 464.

The autobrake interlock decision module 448 may be realized in hardware using digital logic gates and related circuitry that processes the autobrake actuation data to generate the respective enable/disable control signals. The autobrake interlock decision module 448 provides an enable/disable power control signal to the EBPSU 462 based upon TRA sensor values. In this example embodiment the autobrake interlock decision module 448 includes an OR gate 452, an autobrake enable/disable module 460 and an enable/disable power control signal 458. The EBPSU 462 responds to the respective enable/disable power control signal 458 in a manner described herein. The autobrake interlock decision module 448 receives two input signals 454/456 (logic high or logic low) from the RNI/LNI 432/433 as explained above. Input signal 454 conveys whether the left thrust lever 416 is "Advanced" or "idle" and the input signal 456 conveys whether the right thrust lever 402 is "Advanced" or "idle". At least one of the input signals 454/456 have to indicate "Idle" in order for the BSCU 446 and in particular autobrake enable/disable module 460 to output a power enable signal 438 to the EBPSU 462 to activate the EBAC 464 (in this regard, availability of autobrake function is ensured in one engine). Otherwise, the autobrake enable/disable module 460 outputs a power disable signal 458 to the EBPSU 462 to prevent actuation power from reaching the EBAC and in particular to disable the brake actuator 474. In this regard, the power control processing channel 466 provides the necessary architecture to protect against any single failure that could result in inadvertent autobrake application independent of autobrake command processing channel 472.

The autobrake command processing channel 472 may generally include an autobrake command control module 468. The autobrake command processing channel 472 may be realized in the components of electric brake subsystem architecture 400, e.g., the BSCU 446, and the EBAC 464.

The autobrake command control module 468, independently (yet concurrently) from the autobrake interlock decision module 448, receives autobrake actuation data from the digital network interface 439, determines whether the autobrake actuation conditions are met such as no braking system faults and thrust levers in the idle position and generates brake control signals in response to the received autobrake actuation data. If the autobrake actuation data does not indicate that autobrake application conditions are met then the antobrake command control module 468 will generate about 0 % clamping force command (i.e., no brake application). Thus, if the autobrake is commanded inadvertently by autobrake command control module 468, and the autobrake interlock decision module 448 outputs a power disable signal, the autobrake command control module 468 does not activate the brakes.

Briefly, the electric brake subsystem architecture 400 makes use of right TRA data and left TRA data made available on the airplane network 430 to produce autobrake interlock enable/disable control signals in a manner described above. In this regard, power control processing channel 466 and autobrake command processing channel 472 operate concurrently (yet independently) to enable/disable autobrake application in response to the autobrake actuation data using a process explained below.

Figure 5:
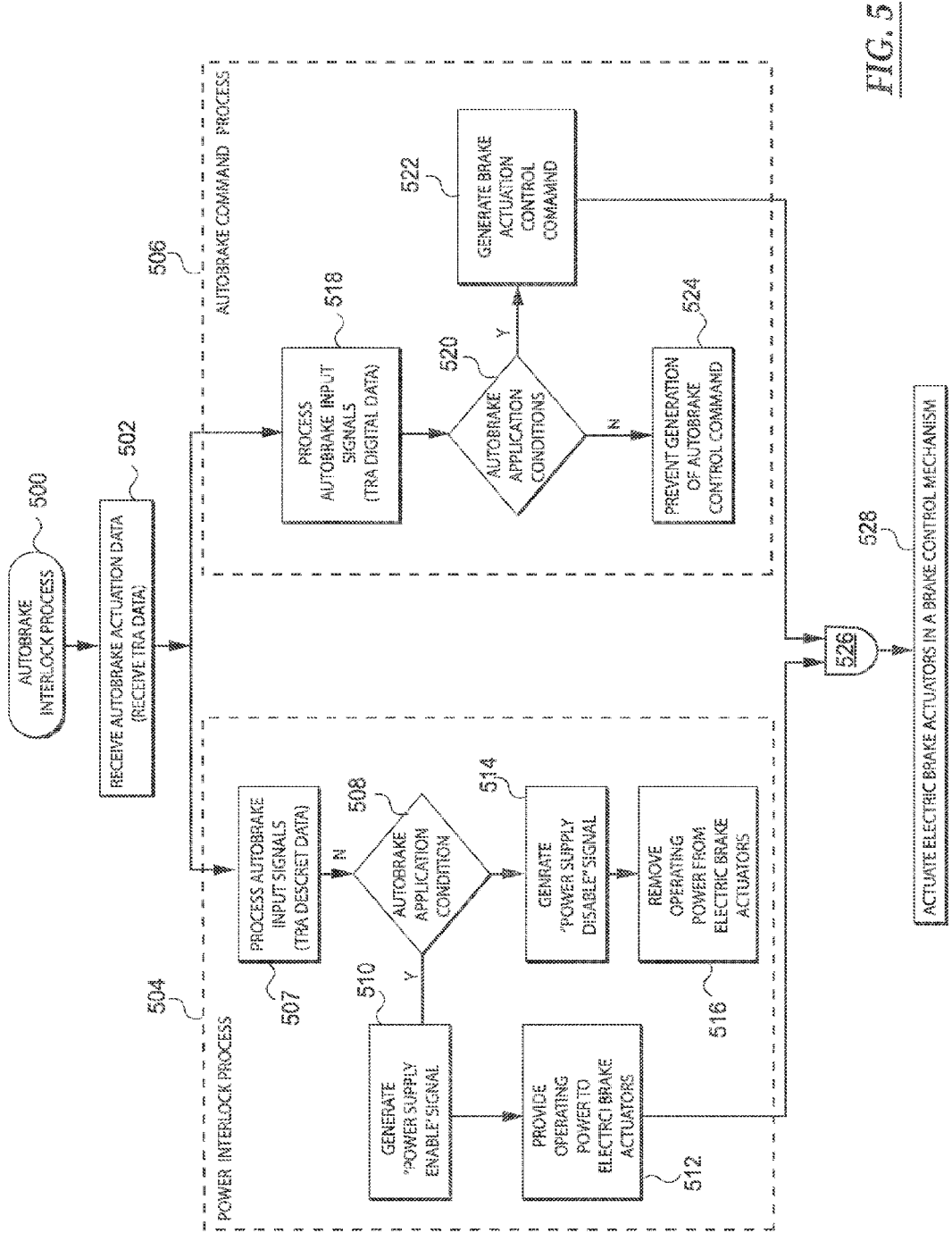
FIG. 5 is a flow chart that illustrates an autobrake interlock process for an aircraft electric autobrake interlock system.

FIG. 5 is a flow chart that illustrates an electric autobrake interlock process 500 suitable for use in connection with an aircraft electric brake system. The various tasks performed in connection with process 500 may be performed by software, hardware, firmware, or any combination thereof. For illustrative purposes, the following description of process 500 may refer to elements mentioned above in connection with FIGS. 1-4. In embodiments of the invention, portions of process 500 may be performed by different elements of the described system. e.g., a BSCU, an EBAC, an EBPSU, or the like. It should he appreciated that process 500 may include any number of additional or alterative tasks, the tasks shown in FIG. 5 need not be performed in the illustrated order, and process 500 may be incorporated into a more comprehensive procedure or process having additional functionality not described in detail herein.

In connection with electric autobrake interlock process 500, the electric autobrake system receives and processes autobrake actuation data (task 502) in a continuous or rapidly sampled manner. FIG. 5 depicts two processing branches that occur concurrently during process 500. A power interlock processing branch 504 is shown on the left side of FIG. 5, and a autobrake command processing branch 506 is shown on the right side of FIG. 5. Power interlock processing branch 504 analyzes the autobrake actuation data and in particular TRA sensor discrete data to determine whether it indicates an autobrake application condition (query task 508). If so, then process 500 generates a "power supply enable" control signal (task 510) that enables a power supply for the brake mechanisms and in particular for the electric brake actuators (task 512). In other words, the brake mechanisms will be able to respond to brake control signals. In this example, process 500 controls an EBPSU to switch its operating power supply on such that the operating power is provided to the EBACs coupled to the EBPSU. In turn, the EBACs provide the operating power to the brake mechanisms and particular to the electric brake actuators.

If query task 508 does not indicate an autobrake application condition, then electric autobrake interlock process 500 will regulate the operating power for the brake mechanisms to disable the brake actuators. In this regard, process 500 generates a "power supply disable" control signal (task 514) that disables the power supply for the brake mechanisms (as a result, process 500 removes operating power from the brake actuators—task 516). In other words, as long as the autobrake application condition is not met, the brake actuators will not be able to respond to any brake control signals because they lack sufficient operating power. In this example, process 500 controls an EBPSU to switch its operating power supply off to remove the operating power from the EBACs coupled to the EBPSU. In turn, the EBACs no longer provide operating power to the brake mechanisms.

Concurrently with (and independent of) power interlock processing branch 504, autobrake command processing branch 506 processes autobrake actuation data and in particular TRA digital data (task 518). If the autobrake actuation data indicate an autobrake application condition (query task 520), then process 500 generates a brake actuation control command in response to the autobrake actuation data (task 522) in an attempt to control actuation of the brake mechanism. In other words, the brake actuation control command will command the brake actuators to actuate by a designated amount, resulting in some brake clamping force. In other words, the brake actuation control command controls the brake mechanisms and in particular the brake actuators to release or apply no clamping force. If the autobrake actuation data does not indicate an autobrake application condition (query task 520), the brake actuation control command will not be generated in an attempt to prevent actuation of the brake actuators (task 524). As mentioned above, these brake actuation commands will be ineffective if power interlock processing branch 504 has removed operating power from the brake mechanisms. In other words process 500 provides actuation control for the brake mechanism and in particular for the electric brake actuators if the following two actions happen: the operating power is provided to enable the electric brake actuators, and the brake actuation control is commanded in response to the autobrake actuation data indicating an autobrake application condition (reference number 256).

In summary, an electric autobrake interlock system as described herein utilizes an autobrake control architecture having a hardware-based autobrake interlock path that provides an on/off control for the operating power of the brake mechanisms and in particular the brake actuators, and a software-based, processing path that generates the brake actuation control commands for the brake mechanisms. With this approach, the probability of uncommanded autobrake application is the probability of both the hardware interlock failing and the software control failing, which is very low in practical deployments. The only components that are in common are the autobrake actuator motors and motor control (unlikely to command on their own) and the source of digital TRA data.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A control arrangement for an autobrake interlock for an electric brake system of an aircraft, the control arrangement comprising:
   a throttle resolver angle (TRA) sensor discrete data module, configured to produce TRA sensor discrete data;
   a TRA sensor data module, configured to produce TRA sensor digital data;
   an autobrake actuator power control architecture, coupled to the TRA sensor discrete data module via a first data path, configured to regulate operating power for a brake mechanism of the electric brake system, the autobrake actuator power control architecture further comprising an interlock decision module configured to process autobrake actuation data and to generate, in response to the autobrake actuation data, an enable/disable control signal for a power supply of the brake mechanism, wherein the autobrake actuation data comprises-TRA sensor discrete data produced by the TRA sensor discrete data module; and
   an autobrake actuator command architecture in parallel with the autobrake actuator power control architecture, coupled to the TRA sensor data module via a second data path, the autobrake actuator command architecture being configured to process brake mechanism commands for the brake mechanism, the brake mechanism commands comprising TRA sensor digital data produced by the TRA sensor data module; wherein
   the autobrake actuator power control architecture is capable of preventing actuation of the brake mechanism independently of the autobrake actuator command architecture; and
   the autobrake actuator command architecture is capable of preventing actuation of the brake mechanism independently of the autobrake actuator power control architecture.

2. A control arrangement according to claim 1, wherein the interlock decision module is configured to enable operating power for the brake mechanism when the autobrake actuation data indicates an autobrake application condition.

3. A control arrangement according to claim 1, wherein:
   the electric brake system comprises an electric brake actuator control coupled to the brake mechanism; and
   the autobrake actuator power control architecture is configured to regulate operating power for the electric brake actuator control.

4. A control arrangement according to claim 1, wherein the autobrake actuator command architecture comprises an autobrake command control configured to generate the brake mechanism commands in response to autobrake actuation data.

5. A control architecture according to claim 4, wherein:
   the electric brake system comprises an electric brake actuator control coupled to the brake mechanism; and
   the autobrake command control is configured to generate the brake mechanism commands for execution by the electric brake actuator control.

6. An electric autobrake interlock system for an aircraft, the electric autobrake interlock system comprising:
   an autobrake system, configured to automatically actuate, independent of pilot brake pedal inputs, an electric brake system of the aircraft upon landing of the aircraft;
   a throttle resolver angle (TRA) sensor discrete data module, configured to produce TRA sensor discrete data;

a TRA sensor data module, configured to produce TRA sensor digital data;
a first brake mechanism for a first wheel of the aircraft; and
a first autobrake control architecture coupled to the first brake mechanism, the first autobrake control architecture comprising:
a first autobrake command control, coupled to the TRA sensor discrete data module via a first data path and coupled to the TRA sensor data module via a second data path, configured to generate brake mechanism command signals for the first brake mechanism in response to autobrake actuation data, the autobrake actuation data including the TRA sensor discrete data and the TRA sensor digital data; and
a first autobrake interlock mechanism configured to regulate operating power for the first brake mechanism in response to the autobrake actuation data, concurrently with operation of the first autobrake command control, and independent of the first autobrake command control.

7. A system according to claim 6, further comprising:
a second brake mechanism for a second wheel of the aircraft; and
a second autobrake control architecture coupled to the second brake mechanism, the second autobrake control architecture comprising:
a second autobrake command control configured to generate brake mechanism command signals for the second brake mechanism in response to the autobrake actuation data; and
a second autobrake interlock mechanism configured to regulate operating power for the second brake mechanism in response to the autobrake actuation data, concurrently with operation of the second autobrake command control, and independent of the second autobrake command control.

8. A system according to claim 7, wherein the second autobrake control architecture operates concurrently with, and independent of, the first autobrake control architecture.

9. A system according to claim 6, wherein:
the first autobrake interlock mechanism resides in an autobrake actuator power control architecture that is configured to enable/disable operating power for the first brake mechanism; and
the first autobrake command control resides in an autobrake actuator command architecture that is in parallel with the autobrake actuator power control architecture, the autobrake actuator command architecture being configured to process the brake mechanism control signals for the first brake mechanism.

10. A system according to claim 9, wherein:
the autobrake actuator power control architecture is capable of preventing actuation of the first brake mechanism independently of the autobrake actuator command architecture; and
the autobrake actuator command architecture is capable of preventing actuation of the first brake mechanism independently of the autobrake actuator power control architecture.

11. A system according to claim 9, wherein the autobrake actuator power control architecture comprises an autobrake interlock decision module configured to:
process the autobrake actuation data; and
generate, in response to the autobrake actuation data, an enable/disable control signal for a power supply of the first brake mechanism.

12. A system according to claim 11, wherein the interlock decision module is configured to enable operating power for the first brake mechanism when the autobrake actuation data indicates an autobrake application condition.

13. A system according to claim 11, wherein the interlock decision module is configured to disable operating power for the first brake mechanism when the autobrake actuation data does not indicate an autobrake application condition.

* * * * *